Oct. 13, 1970 M. SPEWOCK ET AL 3,534,307
ELECTROMAGNETICALLY OR MECHANICALLY CONTROLLED
MAGNETICALLY-LATCHED RELAY
Filed Feb. 13, 1969 6 Sheets-Sheet 1

FIG. 1.

DIRECTION OF MAGNETIZATION OF MAGNET
FIG. 2.

WITNESSES:
Bernard R. Gieguay
James F. Young

INVENTORS
Metro Spewock and
Walter V. Bratkowski.
BY
Willard R. Crout
ATTORNEY

United States Patent Office 3,534,307
Patented Oct. 13, 1970

3,534,307
ELECTROMAGNETICALLY OR MECHANICAL-
LY CONTROLLED MAGNETICALLY-LATCHED
RELAY
Metro Spewock, Export, and Walter V. Bratkowski, Mc-
Keesport, Pa., assignors to Westinghouse Electric Cor-
poration, Pittsburgh, Pa., a corporation of Pennsylvania
Continuation-in-part of application Ser. No. 616,575,
Feb. 16, 1967. This application Feb. 13, 1969, Ser.
No. 806,771
Int. Cl. H01h 9/20
U.S. Cl. 335—170   13 Claims

ABSTRACT OF THE DISCLOSURE

A relay has a magnet structure forming two separate ferromagnetic paths. A single armature or keeper, carrying the movable contacts is movable between the pole faces of two generally C-shaped cores, the latter disposed at opposite ends of a permanent magnet. A winding means encircles both of the separate ferromagnetic paths, and, when energized, "bucks" the flux through the magnetic path closed by the armature and augments or boosts the flux through the other "open" ferromagnetic path so as thereby to effect armature movement to the other ferromagnetic path to change the contact position.

This patent application is a continuation-in-part of United States patent application Ser. No. 615,575, filed Feb. 16, 1967 by Metro Spewock and Walter V. Bratkowski and assigned to the assignee of the instant application.

This invention relates, generally, to electromagnetically or mechanically controlled magnetically-latched relays and, more partciularly, to an improved electromagnetically or mechanically controlled magnetically-latched relay in which the operation is highy effective and reliable to remain in one of its two bistable positions.

Electromagnetic relays have been in use for over 100 years. The greatest use for relays during the first 40 years was in communication applications. They were first used in the telegraph industry, and later in the development of the telephone. A variety of assorted applications in other fields began to grow slowly until relays are now a commonplace component in electrical systems, especially in such applications as automated assembly lines and protective electrical systems. The failure of a relay can mean waste of expensive equipment, or even loss of life. A major requirement of industry for these applications is trouble-free performance over a large number of operations. Such units have a large activity in industrial and space industries.

The present invention is particularly concerned with a new relay design utilizing magnetic snap action and a magnetic flux-transfer principle. The magnetic flux-transfer principle is broadly set forth in United States patent application filed Jan. 19, 1962, Ser. No. 167,360, by Raymond J. Radus, and assigned to the assignee of the instant application. As set forth more fully hereinafter, the design and construction of the permanent-magnet flux-transfer type of relay offers considerable simplicity in design. The control power may be A–C or D–C. Such a design offers increased reliability with a substantial reduction in cost.

The present invention is particularly concerned with magnetic memory characteristics, and utilizes an electromagnetically-controlled magnetic memory device, which utilizes the inherent characteristics of soft ferromagnetic material.

A ferromagnetic material must have atoms whose electron arrangement is such that magnetism is created. The atoms having these magnetic characteristics are grouped into regions called domains. In these domains it is equally probable that magnetism will occur in any one of six directions. In the iron crystal, for example, the atoms are at the corners of a cube-shaped domain with one at the center. This arrangement is called a body-centered cubic lattice. The grouping in a nickel crystal differs from this by having an atom in the center of each face, but none at the center of the cube; this is called a face-centered cubic lattice. The domain in an iron crystal in the absence of an external magnetizing force has its atomic magnetic moments all lined up in a single direction, the direction of one of the edges of a cubic lattice. In a face-centered cubic lattice, such as nickel, the atomic magnetic moments are in the direction of a diagonal of the cube. In unmagnetized ferromagnetic materials, the domains are randomly oriented and neutralize each other. However, the magnetic forces are present. Application of an external magnetic field causes magnetism in the domains to be aligned so that their magnetic moments are added to each other and to that of the applied magnetic field.

With soft magnetic materials, such as iron, small external magnetic fields will cause great alignment, but because of the small restraining force, only a little of the magnetism will be retained when the external magnetic field is removed. With hard magnetic materials, a greater external force must be applied to cause orientation of the domains, but most of the orientation will be retained when the field is removed, thus creating a stronger permanent magnet, which will have one north pole and one south pole.

Materials which may be grouped as soft, range from cast iron, which is one of the poorest to the iron-nickel alloys, which rank among the best. Alnico and barium ferrite are examples of hard magnetic materials.

The present invention utilizes the above-mentioned characteristics of soft magnetic materials by providing two or more ferromagnetic paths, each having a portion common to the other paths. A source of magnetomotive force, such as a permanent magnet, is used to supply flux to each of the paths. If one path has less reluctance than the other paths, the majority of the domains in the above-mentioned common portion will align themselves in the direction of the path having the least reluctance. They will remain so aligned until some external energy is applied to realign them in a different direction. Control of the external energy required to rotate the domain orientation in the common portion is obtained through the use of electromagnetic-control windings associated with each of the ferromagnetic paths or by purely mechanical means. This control of the reluctance from one path to another classifies the device as a memory unit.

It is accordingly, a general object of the present invention to provide an improved magnetically-latched relay device.

Still a further object of the present invention is the provision of an improved magnetically-latched relay in which the power-control windings may be momentarily energized, and following deenergization, the relay, due to its inherent memory characteristics, will remain in the position last imposed by the energization of the power-control windings.

Still another object of the present invention is the provision of an improved electromagnetically-controlled and magnetically-latched relay having a simple construction and adaptable for low-cost production.

Still a further object of the present invention is to provide an improved electromagnetically-controlled magnetically-latched relay readily adaptable for a plurality of contact-making poles.

Still a further object of the present invention is to provide an improved electromagnetically-controlled magnetically-latched relay, which utilizes the domain characteristics of soft magnetic materials.

Still a further object of the present invention is the provision of an electromagnetically-controlled magnetically-latched bistable relay, which utilizes simple magnetic memory characteristics, which rely upon the remnant properties of ferromagnetic materials.

Another object is to provide an improved mechanically-controlled magnetically-latched relay.

Another object is to provide an improved magnetically-latched relay, which may be electrically or mechanically controlled.

In accordance with one embodiment of the present invention, there is provided a magnet structure forming two separate ferromagnetic paths. A single armature, or keeper member, is situated between the pole faces of two generally C-shaped cores, the latter being disposed at opposite ends of a permanent magnet. A cantilever assembly, carrying one or more contact-making poles, is secured to, and movable with the aforesaid keeper. An electromagnetic power-control winding means is provided being associated with the two separate ferromagnetic paths, and arranged so that upon energization, said power-control winding means "bucks" the flux sent through a closed ferromagnetic path by the permanent magnet, and simultaneously augments the flux sent through the other open ferromagnetic path by the permanent-magnet structure. The electromagnetic power-control winding means includes at least one control coil encircling each ferromagnetic path, with the control coils electrically connected in series for simultaneous energization. By reversing the direct current through the power-control winding means, the normal magnetic flux is deliberately cancelled out in the particular ferromagnetic path closed by the keeper, whereas the flux in the other open ferromagnetic path is deliberately increased by the energization of the power-control winding means. The result is that the movable keeper is alternately released from the pole faces of one closed ferromagnetic path, and is simultaneously magnetically attracted toward the other open ferromagnetic path, thereby carrying the contact-making poles therewith to the new contact position. As a result, a magnetically-latched bistable relay with two contact positions is provided.

According to another embodiment of the invention, instead of a flexible cantilever assembly being provided, a pivotally-mounted keeper assembly is utilized also carrying the contact-making poles therewith.

Other embodiments of the invention concern various circuitry for controlling the coils in any sequence, or even controlling the magnetically-latched relay by mechanical means.

Further objects and advantages will readily become apparent upon reading the following description, taken in conjunction with the drawings, in which.

Figure 1:
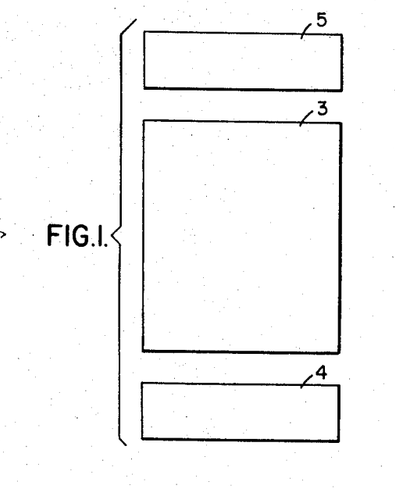
FIG. 1 is a front elevational view of permanent-magnetic apparatus which shows the memory principles utilized in the present invention.
Figure 2:
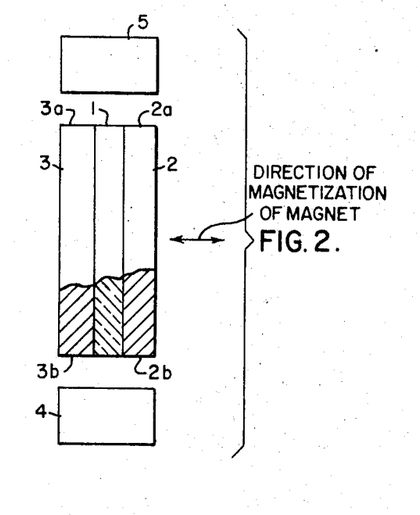
FIG. 2 is a right-hand side elevational view of the permanent-magnetic apparatus shown in FIG. 1.

In FIG. 2 there is shown a ceramic permanent magnet 1 used as a source of magnetmotive force sandwiched between two soft ferromagnetic bars 2 and 3. The permanent magnet 1 is magnetized in the direction perpendicular to the soft magnetic bars 2 and 3, as indicated by the arrow in FIG. 2. Two keepers 4 and 5, also made of soft magnetic materials, are placed so that they may complete separate ferromagnetic paths through the common portion consisting of bars 2 and 3 and permanent magnet 1. The devices comprises the ceramic permanent magnet 1 and the soft magnetic bars 2 and 3. It is capable of holding a cold-rolled low-carbon steel keeper against the pole faces with a pull of approximately 26 pounds. The high coercive force of the barium ferrite material 1 permits the magnetic length to be shorter for the same pole-face area than magnets of other materials. In addition, the flux density at the pole faces 2a, 2b, 3a, 3b of the device, shown in FIG. 1, can be raised to five times the flux density in the magnet 1 by making the area of the pole face smaller than the magnetic area. The combination of these two design features yields a relatively small magnet, which has a high flux density at the pole faces, but which has very little "reach-out" power. As stated previously, the device can hold one keeper, for instance keeper 4, with a pull of approximately 26 pounds. If another keeper was placed upon the magnetic structure in FIG. 1, such as keeper 5, it would not be held with much force (i.e., less than 26 pounds); that is, it would be held with less force than the keeper 4 only if it were placed on the structure after keeper 4 had been placed on the device.

Figure 3:
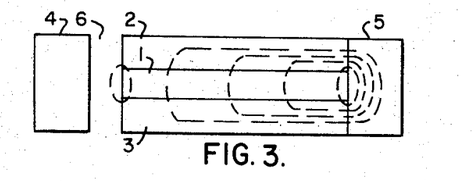
FIGS. 3 and 4 shown the use of the permanent-magnet apparatus illustrated in FIGS. 1 and 2.
Figure 4:
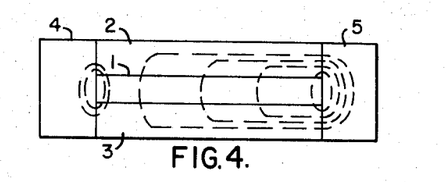

FIG. 3 shows what occurs when one keeper is placed upon the device. In this figure it can be seen that the domains of the soft magnetic material in the bars 2 and 3 have aligned themselves in a direction of the flux path including permanent magnet 1, bar 2, keeper 5 and bar 3. Very few lines of flux are present in the air gap 6 between the keeper 4 and the device. In FIG. 4 there is shown what happens when the keeper 4 is placed against the device. Though there now appears to be two separate ferromagnetic paths, which are physically and magnetically equal, the flux does not divide equally between the two paths. The first path, mentioned previously, includes keeper 5; and the second path includes permanent magnet 1, bar 2, keeper 4 and bar 3. The domains of the soft magnetic material in bars 2 and 3 have aligned themselves in a direction of the path including keeper 5. Therefore, this is still a low-reluctance path for the flux applied by the permanent magnet 1, and very little will be supplied to the path including the keeper 4. This device can be used to distinguish between four possible states, and for one of these states, there are two alternatives of priority. The four states are: (1) no keepers; (2) keeper 4 in contact with the device, keeper 5 not in contact with the device; (3) keeper 5 in contact with the device, keeper 4 not in contact with the device; (4) keepers 4 and 5 both in contact with the device.

Two alternatives of priority for state 4 are: (a) keeper 5 placed before keeper 4 and (b) keeper 4 placed before keeper 5. In a sense the above-description qualifies as the design of a memory device, or storage element for digital information, i.e., the device remembers which keeper was placed on it first. In FIG. 4 if keeper 5 were removed the domains would align in the path including keeper 4 and if keeper 5 was again placed against the device, it would be held with much less force than keeper 4.

Figure 5:
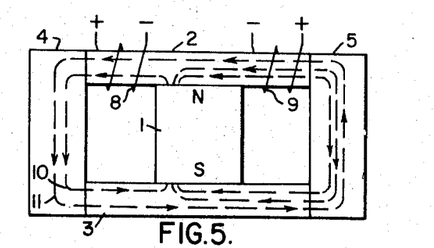
FIGS. 5 and 6 are descriptive of the electromagnetic external power control of the magnetic memory phenomenon shown in FIGS. 1-4.
Figure 6:
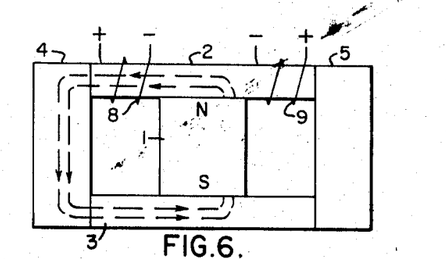

In order to achieve the control over the alignment of the domains in the common portions 2 and 3 without the necessity of physically moving keepers 4 and 5, electromagnetic control windings 8 and 9 were added to a device similar to the one shown in FIG. 4, whose domains were aligned in the direction of the path including keeper 5. Such a device is shown in FIG. 5. The control winding 8 has a signal applied to it, which causes a flux to be produced in the direction of the flux produced by the permanent magnet 1 in the keeper 4. The flux from the permanent magnet 1 is shown by the inner dotted lines 10, and the electromagnetic flux from control winding 8 is shown as the outer dotted line 11. The electromagnetic control winding 9 produces a flux which joins with the flux from coil 8, and tends to buck the flux of the ferromagnetic path including keeper 5. This superposition of the electromagnetic field upon the permanent magnet field is such that the value of the electromagnetic field causes the effective reluctance of the path, including keeper 4 and the permanent magnet 1, to be lower than the effective reluctance of the path including keeper 5 and permanent magnet 1. The domains in the common portion of the bars 2 and 3 become aligned in a direction of the path including keeper 4. When the electromagnetic control windings no longer supply magnetomotive force to the device, as shown in FIG. 6, the path, including keeper 4, continues to have a lower reluctance than the path including keeper 5, and therefore most of the lines of flux continue to stay in this path. Thus, it can be seen that a pulse, or short-time duration signals, applied to the control windings 8 and 9, can be used to switch the lines of flux emanating from the permanent magnet 1 from one path to another. It is most important to note that the magnetic fields attain equilibrium, or stable states, after each flux transfer. Its stability is not destroyed if the electromagnetic field is removed. One important feature is that with proper choice of magnitude of electromagnetic field, virtually complete transfer of permanent magnet field can be achieved as shown in FIG. 6.

Figure 7:
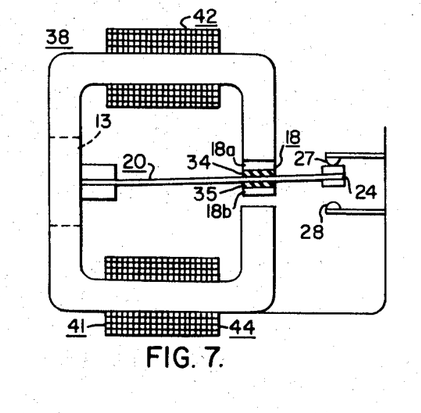
FIG. 7 is a side elevational view of an electromagnetically-controlled magnetically-latched relay incorporating principles of the present invention.
Figure 8:
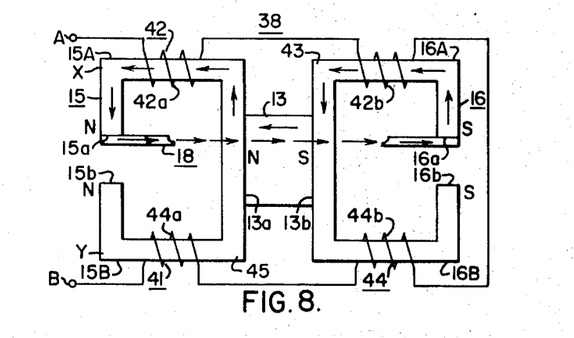
FIG. 8 is an exploded view of the magnetic structure of the magnetically-latched relay of FIG. 7.
Figure 9:
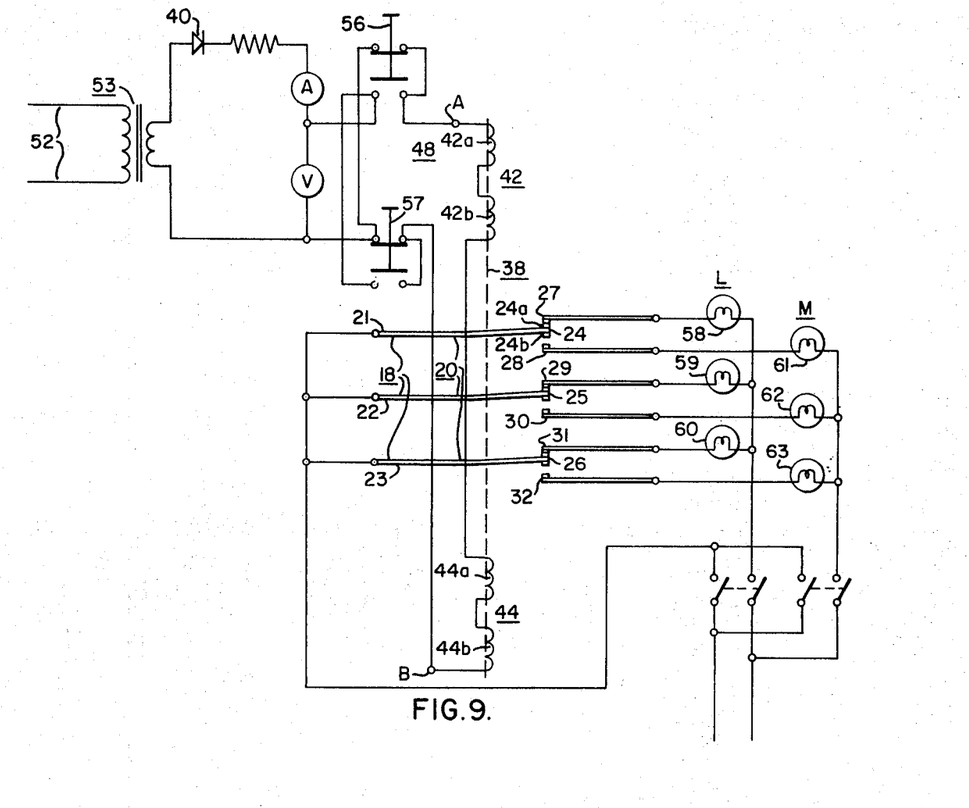
FIG. 9 is a diagrammatic view of the control circuits for reversing the direct current to the control windings of the electromagnetically-controlled, magnetically-latched relay of FIGS. 7 and 8.

With the foregoing principles in mind, and with reference to FIGS. 7–9 of the drawings, it will be observed that there is provided a permanent magnet 13, which may be of barium ferrite or strontium ferrite, for example, having a polarity as indicated in FIG. 8 of the drawings. Extending vertically at each end 13a, 13b of the permanent magnet 13 are two generally C-shaped leg or core portions 15, 16 of a relatively soft magnetic material, such as cold-rolled steel. As a result, there are provided four pole faces 15a, 15b, 16a, 16b, which may be alternately magnetically bridged by a vertically-movable keeper, or armature 18, which comprises two plates 18a, 18b each insulatingly secured to each side of a cantilever assembly 20, comprising three contact arms 21–23, each carrying contacts 24–26 and composed of a nonmagnetic material, such as copper or brass.

As shown in FIGS. 7 and 9, the movable contacts 24–26, disposed at the outer extremity of the nonmagnetic cantilever assembly 20, may alternately make engagement between pairs of spaced relatively stationary contacts 27–32 (FIG. 9) insulated from each other.

In more detail, a pair of armature, or keeper plate members 18a, 18b are provided disposed on opposite sides of the cantilever assembly 20, being insulated therefrom, by insulating sheets 34, 35 (FIG. 7), so that the armatures 18a, 18b will not conduct any current from the controlled circuits through the contact arms 21–23.

It will be apparent that an important feature of the present invention is the curving of the ends of the bars 15, 16 toward each other in the shape of a C, and only one keeper 18 is used, as contrasted with the aforesaid patent application, which used two keepers.

FIG. 8 more clearly shows the construction, in an exploded view, with the two C-shaped bars 15, 16 at the opposite ends of the interposed permanent magnet 13. As flux is transferred from one ferromagnetic path 43 to the other path 45, the keeper 18 alternately moves from the ends of each C to the other pole-face ends of the C-shaped bars 15, 16, thus making possible the relay's switching action.

The relay 38 described in the present invention does not require the continual application of voltage to the electromagnetic control winding means 41 to operate the relay. A relay of this type can be operated with very low power, and therefore, is highly desirable for telephone switching systems, automation, etc. The relay 38 can have any combination of normally-closed or normally-open contacts. For purposes of simplicity, the use of the relay with three normally-closed and three normally-open contacts has been described. As indicated in FIG. 9, the relay 38 comprises three contact poles, each having a double throw, and a flux-transfer device for operation. The double-throw feature is optional. The relay can be operated on an AC or DC voltage. When using AC power, a single diode 40 provides the necessary DC switching power, as illustrated in FIG. 9 of the drawings.

As illustrated in FIG. 9, the three-pole relay 38 comprises three copper, current-carrying cantilevers 21, 22 and 23, for example. An electrically-insulated magnetic steel strap assembly 18 bridging all three cantilevers 21–23 is the keeper, or movable armature, through which the magnetic field acts to pull in the contact cantilever arms 21–23, which carry the movable contacts 24–26.

The electromagnetic power-control winding means 41 comprises a first control winding means 42 wound about the upper ferromagnetic path 43, as viewed in FIG. 8, and a second control winding means 44 wound about the lower ferromagnetic path 45, also as viewed in FIG. 8. For the particular embodiment of the invention illustrated in FIGS. 7–9 for highly effective and fast-acting operation, the first, or upper control winding means 42 comprises two coils 42a, 42b wound respectively about the upper leg portions 15A and 16A and the second, or lower control winding means 44, also comprises two coils or windings 44a, 44b wound respectively about the lower leg portions 15B, 16B. In the embodiment of the invention shown in FIGS. 7 and 9, the first control winding means 42 and the second control winding means 44 are connected in electrical series so that they may be simultaneously energized. Since the first and second control winding means 42, 44 are electrically arranged in electrical series, it is possible by a reversing switch means 48 (FIG. 9) to conduct currents in opposite directions, so as to effect flux transfer from the upper magnetic path 43 to the lower magnetic path 45 according to the principles described hereinabove, in connection with FIGS. 1–6 of the drawings.

Arcing tips 24a, 24b, for example are shown attached to the cantilever arm 21; however, the tips of the cantilever arm 21 can be plated with silver, gold or some other suitable contact material. The use of contacts or plating will depend upon the the application.

The relay 38 of the present invention may be operated in air, vacuum or a suitable gas, such as sulfur hexafluoride gas ($SF_6$) to quickly effect any arc extinction. The operation of the contacts 24–26 in a vacuum, or gas would significantly reduce contact oxidation, and greatly extend the operating life of the relay.

FIGS. 7 and 8 show the magnetically-activated cantilever such as assembly 20 in its simplest form. The individual cantilever members 21–23 are made from aluminum, copper, or a copper alloy, or other suitable nonmagnetic material. The magnetic circuit for the relay is illustrated in FIG. 8. Since copper is not magnetic, keepers 18a, 18b made from a magnetic material, are fastened across the cantilever assembly 20 on both sides thereof.

In the embodiment of FIGS. 7 and 9, all of the control windings 42a, 42b, 44a, 44b are connected in electrical series and wound in such a manner that when the control current, or switching current is directed through them, all contribute to produce opposite electromagnetic polarities at the two ends of the C-shaped magnet. To switch the relay 38, current direction is so chosen as to cancel the permanent magnetic flux in the upper half of the magnetic circuit 43 closed by the keeper 18 (FIG. 8) and to produce a flux of opposite polarity in the lower open ends of the C, thus attracting the keeper to that ferromagnetic path 45.

Figure 8A:
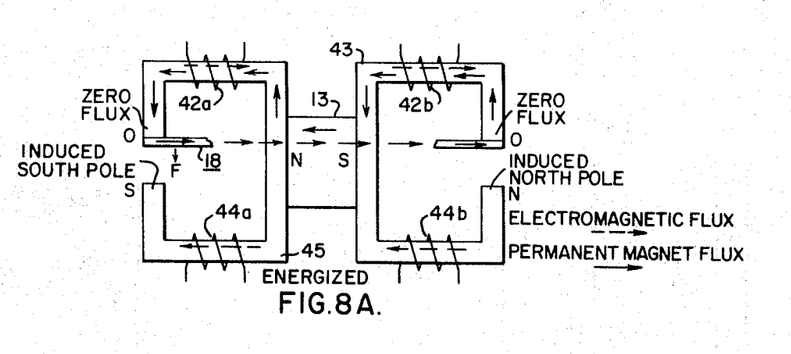
FIGS. 8A-8C are views similar to that of FIG. 8, but illustrating the magnetic pole conditions resulting from energizing the electromagnetic power-control winding means to effect a different contact position from one contact position shown in FIG. 8.
Figure 8B:
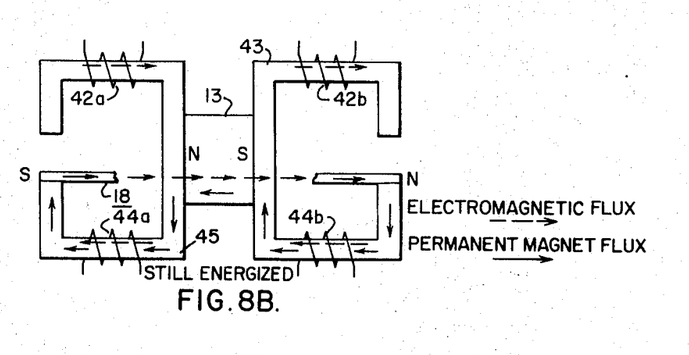
Figure 8C:
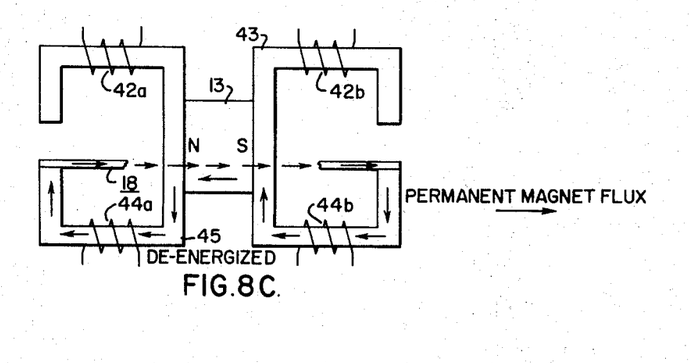

For example, referring to FIG. 8, which schematically shows the "sandwich" opened, suppose that the keeper 18 is resting against the upper half of the C, and it is desired to move the keeper 18 to the other side to thereby switch the relay 38. Current would be passed through the control coils in the direction which would produce an electromagnetic flux opposite to the permanent magnet flux, and cancelling it in the upper path 43. Thus the keeper 18 and cantilevers 21–23 are released. Note FIG. 8A in this connection. At the same time that flux cancellation is occurring in the upper magnetic circuit 43, electromagnetic flux of opposite polarity is being produced in the lower path 45. Thus an attractive force is built up pulling the keeper 18 down to the lower path 45 at the same time it is being released by the upper path 43. Therefore, the cantilevers 21–23 are pulled, or snapped very quickly to the new position 45. Once the keeper 18 has made contact with the bottom half of the C-core, the magnetic reluctance in this new path 45 is much less than through the previous path 43, which now includes an air gap. Therefore, without any further influence from the electromagnetic field, the flux from the permanent magnet 13 shifts down to the lower path 45 of the C-core. Once the cantilevers 21–23 have been pulled into this new position 45, and the electric pulse terminated, the magnetic field from the permanent magnet 13, having been transferred by the electrical pulse, holds the cantilevers in position 45 by pulling on the keeper 18.

When it is desired to switch the relay 38, a pulse of direct current is directed in the opposite direction through the control coils. Now the reverse of the preceding procedure occurs, i.e., the lower end of the magnet 45 releases the keeper 18, and the upper path 43 attracts it. Operation of the relay 38 requires simply a switch, which permits changing the direction of the direct current through the control coils 42a, 42b, 44a, 44b.

Figure 10:
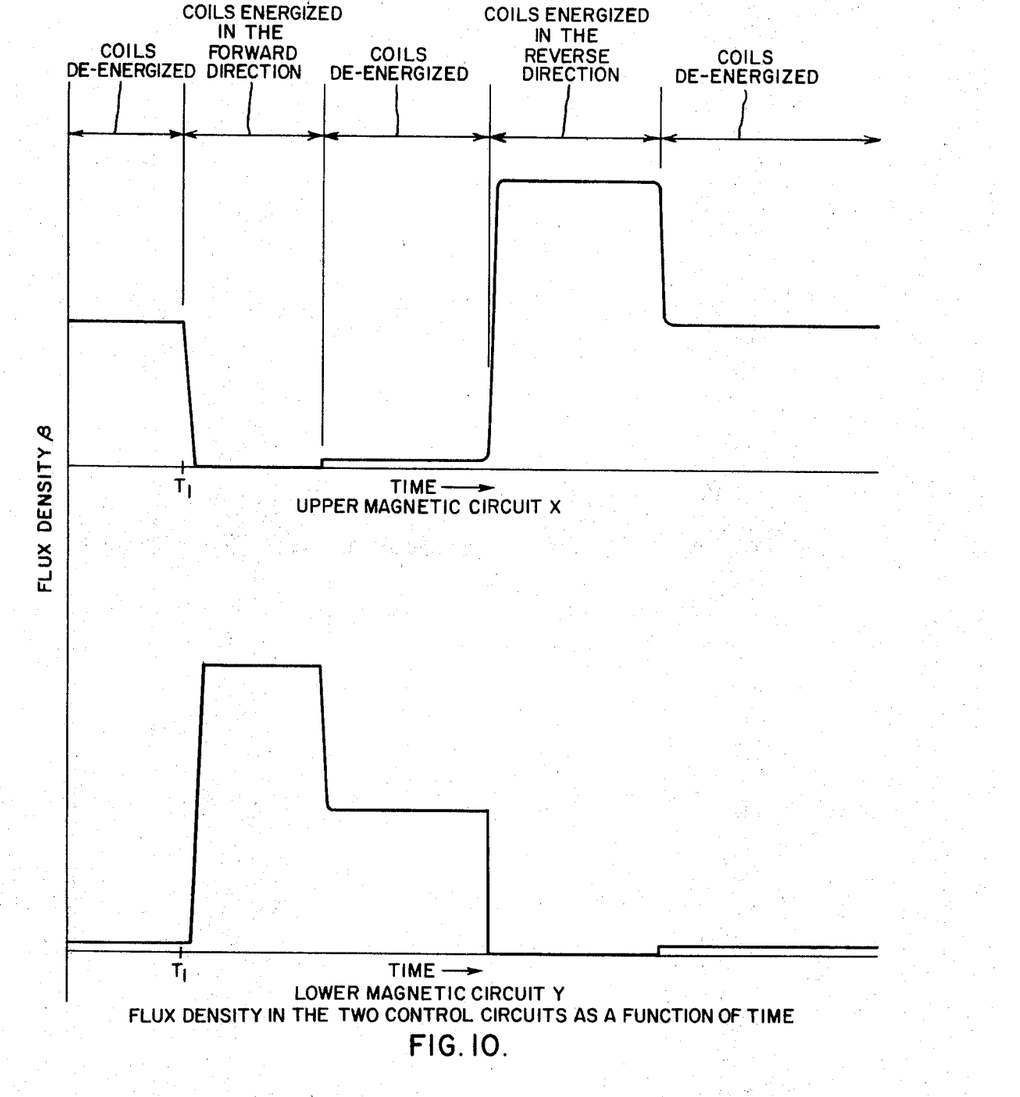
FIG. 10 is a diagram of the magnetic force conditions acting on the keeper for the two magnetic paths as a function of time of application of energizing the power control winding.

FIG. 10 diagrammatically illustrates, in superimposed relation, the flux density in the upper and lower magnetic circuits 43 and 45 as a function of the energization of the electromagnetic power-control windings. It will be noted that at the time $T_1$ the power-control windings are energized to consequently cancel the flux density $\beta$ in the upper magnetic circuit 43, thereby reducing the pulling force upon the keeper assembly 18. At the same time, the augmenting magnetic field, as set up by the lower power-control windings 45a, 45b, increases the flux density in the lower magnetic circuit 45, so that the pulling force exerted upon the keeper assembly 18 increases in a direction to have the keeper assembly 18 bridge the lower pole faces 15b, 16b of the lower magnetic path 45. Thus, the flux density, or magnetic pulling force, exemplified in diagrammatic view FIG. 10, illustrates the forces involved to effect a change in the contact position of the permanent magnet 38.

The embodiment of the invention, illustrated in FIG. 7, utilizes a flexing cantilever assembly construction. As a result, there is the possibility of utilizing an electromagnetically-controlled, magnetically-latched relay having no rotating or sliding parts, but only a flexing of the cantilever during the normal operation of the relay.

Figure 11:
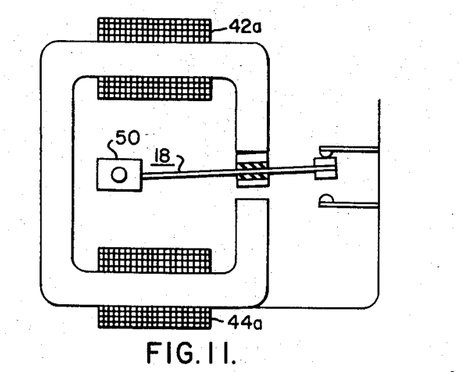
FIG. 11 illustrates a modification of the magnetically-latched relay structure of FIG. 7, utilizing a pivoted mounting for the cantilever contact-making arm.

However, as illustrated in FIG. 11, the cantilever assembly 20 may be mounted on a pivotal support 50 with the same manner of operation.

FIG. 9 illustrates a schematic diagram of the relay, power supply, and external loads, which are represented as being simple light bulbs.

With reference to FIG. 9 of the drawings, it will be observed that there is provided a power source 52, which, for example, may be a 110 volt, 60 cycle source. A step-down transformer 53 is provided to reduce the voltage to a value of 6.3 volts, and the provision of the receitifier diode 40 provides a source of direct-current potential. By pressing am anually-operated push-button switch 56, current is sent in one direction through the four series windings 42a, 42b, 44a, 44b to effect contact transfer, and upon release of the push-button 56 the windings are completely deenergized.

Pressing the other manually-operated push-button 57 sends direct current in a reverse direction through the four series power-control windings 42a, 42b, 44a, 44b to again effect the different contact position. The lamp bulbs 58–63 represent a load circuit with the contacts 24–26 alternately lighting the two banks of lights L and M. The aforesaid circuit, as represented in FIG. 9, constituted an experimiental setup for experimentally verifying the reliable operation of the permanent-magnet relay 38.

It will be noted that when the electromagnetic flux is directed through the C-core the flux density increases rapidly in the gap between each edge of the keeper and the pole faces of the C-core. Thus, an attractive force is set up which pulls in the keeper and cantilever. This action takes place so quickly, with a high-permeability material, that snap action is obtained when changing the moving contacts to one side or the other of the stationary contacts. Since the 50% nickel-iron alloy designated "Hipernik" saturates at a high flux density, $\beta$, at less than one oersted, and has a very high initial magnetic permeability, it was chosen for the keeper material 18 for one example of a high-permeability material. The C-core 15 or 16 was made from cold-rolled steel; however, it can be made from any other suitable magnetic material including "Hipernik. The attractive force which exists between the pole face of the C-core 15 or 16 and the edges of the keeper 18 is given by Maxwells equation or:

$$F_0 = \frac{\phi_G^2}{8wa}$$

where $\phi_G$=the flux in the gap
$w$=width of the keeper 18
$a$=length of overlap of C-core pole face and keeper.

The permeability of the C-core and keeper is high enough to have equipotential surfaces near the gap, therefore the magnetic pull $F_m$ can be expressed as follows:

$$F_m = \frac{F_0}{1 + k\frac{x}{a}}$$

where $F_0$ is defined by Maxwell's Law, $k$ is a function of the thickness and width of the contracting surfaces, and $x$ is the gap between the pole face and keeper. Since the flux in the gap between the high permeability keeper 18 and C-core can change rapidly, the magnetic pull force also changes rapidly. Thus, magnetic snap action is obtained on the application or removal of a magnetic field. The major factor in obtaining snap action is the flux-carrying capacity of the keeper 18 and C-core, as limited by the saturation density of the material from which they are made.

This invention disclosed a new relay principle which requires little power to operate, requires no holding power, has magnetic snap action built in by proper choice of magnetic materials, and can be adapted to a wide variety of relay and contactor applications.

Figure 12:
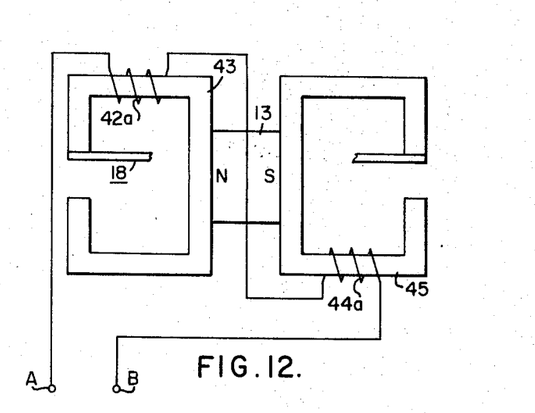
FIG. 12 is a modified type of relay using only two series coils instead of four.

FIG. 12 illustrates a modified form of the invention using only a single coil 42a surrounding the upper ferromagnetic path 43, and a single lower coil 44a surrounding the lower ferromagnetic path 45 with the two coils connected electrically in series. They may be connected to the tapping points A, B of the reversing switch circuit of FIG. 9 for momentary forward and reverse energization, as explained hereinbefore. Thus the invention may be practiced either with four coils, as shown in FIGS. 7–9, or with two series coils only, as shown in FIG. 12. In the arrangement of FIG. 12, the control coils 42a, 44a may be transferred to the other legs of the C-cores 43, 45 if desired to effect the same electrical operation.

From the foregoing, it will be apparent that there has been provided an improved electromagnetically-actuated relay 38, which is magnetically-latched in one of two positions 43, 45 upon deenergization of the control coils 42, 44. Since the domain characteristics of the soft magnetic material have been changed, and since an air gap is present in the other magnetic circuit, with a relatively high reluctance, the relay will remain in the last position until a next succeeding pulse of current is provided through the control coils 42, 44.

Figure 13:
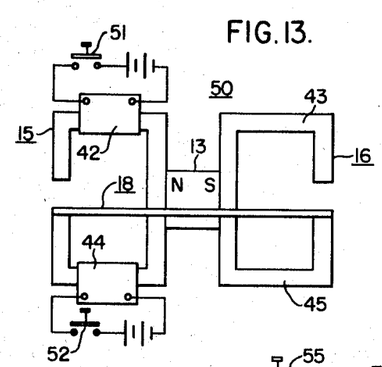
FIGS. 13-19 illustrate various circuitry for energizing the control coils in any sequence to actuate the magnetically-latched relay; and, FIGS. 20 and 21 show a relay mechanically actuated.
Figure 14:
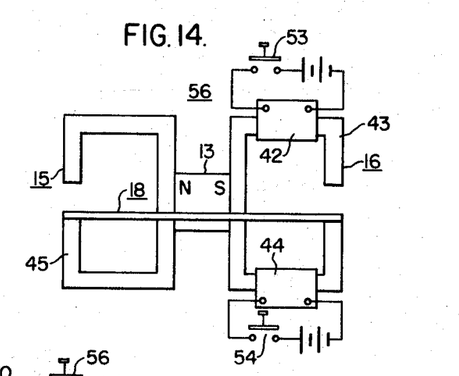

The control coils 42a, 42b, 44a, 44B being connected in series, as shown in FIGS. 7 and 9, is only one arrangement in which the relay 38 can be actuated. The control coils may, however, be connected in series, in parallel, or energized individually. The important thing in this connection is that current in each control coil is in the right direction, that is, to buck-out flux or aid the permanent-magnet flux. For example, FIG. 13 shows a relay 50, having control coils 42, 44 separately actuated. They may be energized simultaneously, or sequentially in any manner. FIG. 14 illustrates a modified-type of arrangement of a relay 56 having the control coils 42, 44 disposed upon the other C-leg 16 of the relay. Again, as in the arrangement of FIG. 13, they may be energized simultaneously, or sequentially in any manner.

Figure 15:
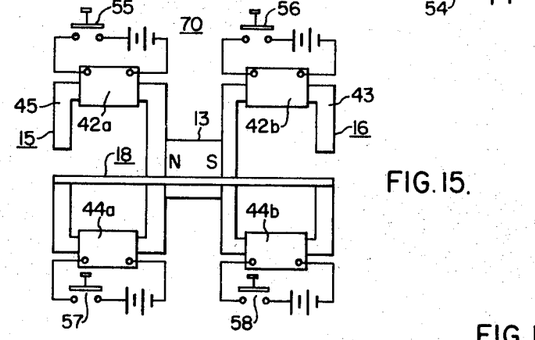

As illustrated in FIGS. 13 and 14, the control coils may be operated separately, or in any sequence using two coils on one C-core, or two coils on each C-core, or one or more coils on each C-core, or at any point in the magnetic path. For example, FIG. 15 shows an arrangement 70 in which the control coils 42a, 42b, are disposed upon the upper legs of the C, and the two coils 44a and 44b are disposed on the lower legs of the C-cores. As mentioned hereinbefore, it is only necessary that the current in the control coils is in the right direction, that is to buck-out the flux, or aid the permanent-magnet flux.

Figure 16:
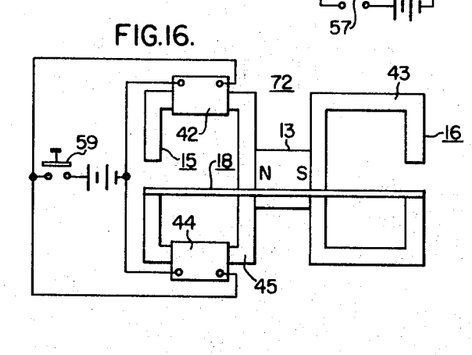
Figure 17:
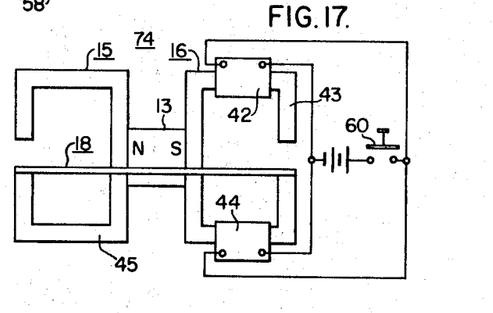
Figure 18:
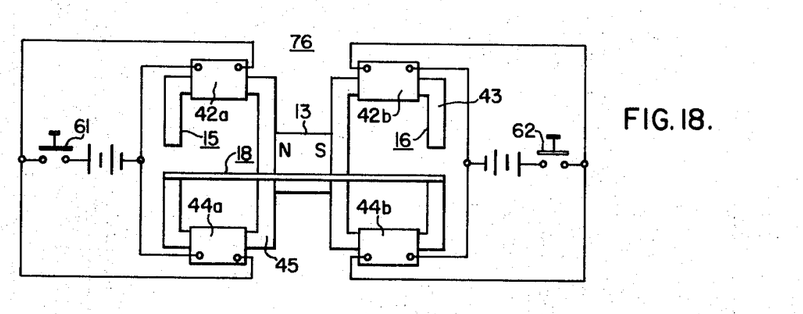

FIGS. 16–18 illustrate modified types of relay arrangements 72, 74, 76 in which the control coils are arranged in parallel arrangement. Thus, the pressing of the pushbuttons 59, 60 simultaneously energizes the control coils, thereby causing movement of the keeper 18.

Figure 19:
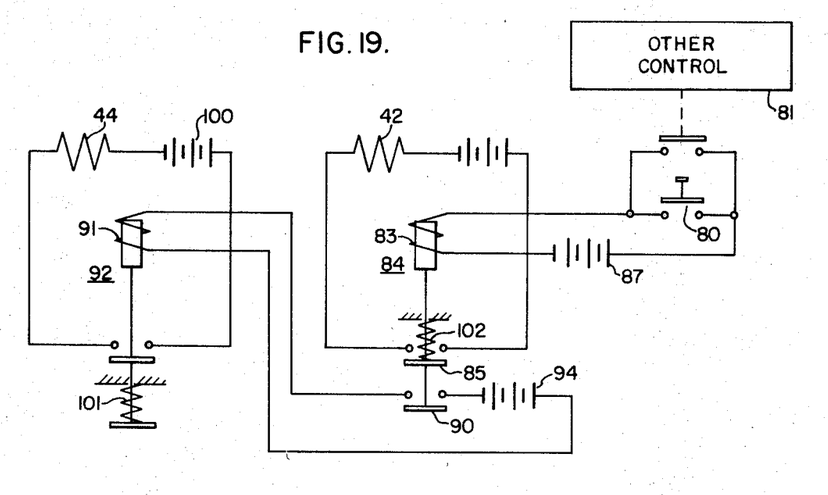

FIG. 19 illustrates circuitry controlling the energization of the control coils 42, 44 of FIG. 13. As shown in FIG. 19, a pushbutton 80, or other control 81 may be utilized to energize the solenoid 83 connected with the relay 84, which, through its contact 85, energizes the control coil 42 through a battery 87. In addition, the energization of the relay 84 also closes the contact 90, which energizes the solenoid 91 of the relay 92 through the battery 94, and thereby activates the control coil 44 through the battery 100. The biasing springs 101, 102 may be utilized to open the contacts, once the coils 42, 44 have been energized, and the keeper 18 has moved to its alternate position.

Figure 20:
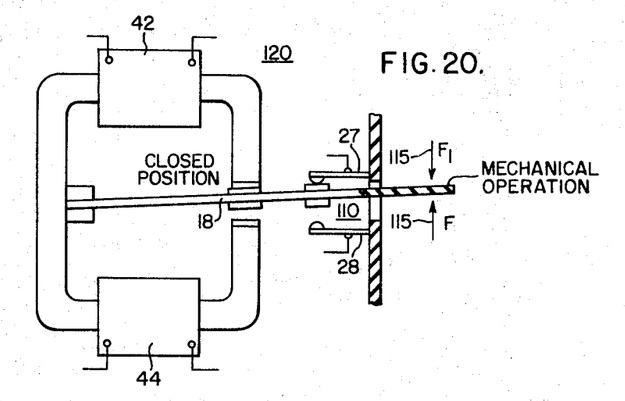
Figure 21:
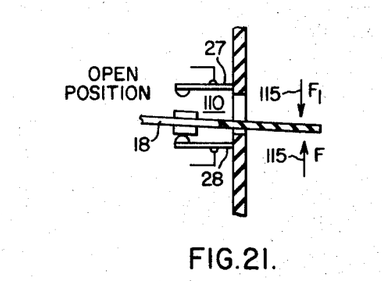

In addition to being operated by electromagnetic means, the relay of the present invention can be operated manually, or mechanically by some external means by hand, another relay, or some other mechanical system, or combination of these The electromagnetic relay can also be operated by some external mechanical means along with the electrical means. FIGS. 20 and 21 show such an arrangement in which the manual switch 110 may be mechanically moved by some means 115, which, in turn, will cause the keeper 18 to be moved to its alternate position. The control coils 42, 44 may be energized in the manner taught hereinbefore to effect an electrical operation of the keeper 18. Thus, in the relay arrangement 120 of FIG. 20, either mechanical means or electrical means may alternatively be utilized to effect operation of the relay 120.

We claim as our invention:

1. A bistable permanent-magnet-type relay including a permanent magnet interposed between two spaced generally C-shaped cores (15, 16) a ferromagnetic material and defining two separate magnetic paths (43, 45) with portions of said cores in common with said two magnetic paths, a movable keeper (18) of ferromagnetic material movable from one stable first position of magnetic engagement with the spaced-apart pole faces (15a, 16a) associated with first ends of said spaced C-shaped cores (15, 16), said movable keeper (19) being capable of movement to a second stable position of magnetic engagement with the other spaced-apart pole faces (15b, 16b) associated with the other ends of the spaced C-shaped cores (15, 16), first electromagnetic winding means (42) encircling one magnetic path (43), second electromagnetic winding means (44) encircling the other magnetic path (45), means for energizing the first and second electromagnetic winding means, reversible current supply means for selectively reversing the flow of direct current through said first and second winding means (42, 44) to augment the flux density in one ferromagnetic path and at least partially cancel the flux density in the other ferromagnetic path, movable contact means (21) responsive to the motion of said movable keeper (18), and stationary contact means (27) cooperable with said movable contact means.

2. The bistable permanent-magnet-type relay of claim 1, wherein a cantiliver assembly carrying the movable contact means and movable keeper is provided, and said assembly is capable of flexing movement.

3. The bistable permanent-magnet-type relay of claim 1, wherein a pivoted contact arm assembly carrying the movable contact means and movable keeper is provided.

4. The combination of claim 1, wherein the movable keeper (18) comprises a pair of spaced plates (18a, 18b) of ferromagnetic material which are insulated from said movable contact means (21).

5. A permanent-magnet-type relay including a bar permanent magnet (13) having C-shaped ferromagnetic cores (15, 16) at the opposite ends thereof, a movable keeper (18) alternately bridging the two sets of pole faces (15a, 16a, 15b, 15b) of said C-shaped cores (15, 16), movable contact means (21) carried by said movable keeper, stationary contact means cooperable with said movable contact means, first coil means (42) for at least partially cancelling the magnetic flux in one magnetic path (43) defined by said bar permanent magnet and spaced leg portions (15A, 16A) of said C-shaped cores (15, 16) second coil means (44) for at least partially augmenting the flux density of the bar permanent magnet in the other spaced leg portions (15B, 16B) of said C-shaped cores (15, 16), means for energizing the first and second coil means, and reversible direct current supply means for selectively sending direct current in opposite directions through said first and second coil means (42, 44).

6. The combination of claim 5, wherein the movable keeper (18) is carried by a cantilever assembly (20) which also carries said movable contact means.

7. The combination of claim 5, wherein the movable keeper (18) is carried by a pivoted assembly (50) which also carries said movable contact means.

8. The combination according to claim 1, wherein two series coils (42a, 42b) encircles one ferromagnetic path, and two other series coils (44a, 44b) surround the other ferremagnetic path, and all the said coils are electrically connected in series.

9. The combination according to claim 1, wherein only a single coil (42a) encircles one ferromagnetic path, and only a single coil (44a) surrounds the other ferromagnetic path, with said two coils being electrically connected in series.

10. The combination of claim 1, wherein the first and second electromagnetic winding means are in electrical series.

11. The combination of claim 5, wherein the first and second coil means are in electrical series.

12. A bistable permanent-magnet-type relay including only a single permanent magnet interposed between two spaced generally C-shaped cores of a ferromagnetic material and defining two separate magnetic paths with portions of said cores in common with said two magnetic paths, a linearly movable keeper of ferromagnetic material having an actuating portion movable from one stable first position of magnetic engagement with the spaced-apart pole-faces lying in a common plane associated with first ends of said spaced C-shaped cores, means for moving said actuating portion associated with said keeper so that the keeper moves to a second stable position of magnetic engagement with the other spaced-apart pole faces lying in a common plane parallel to said first pole faces associated with the other ends of the space C-shaped cores, movable contact means responsive to the movement of said movable keeper, and stationary contact means cooperable with said movable contact means.

13. A bistable permanent-magnet-type relay including a permanent magnet interposed between two spaced generally C-shaped cores of a ferromangetic material and defining two separate magnetic paths with portions of said cores in common with said two magnetic paths, a movable keeper of ferromagnetic material having an actuating portion movable from one stable first position of magnetic engagement with the spaced-apart pole-faces associated with first ends of said spaced C-shaped cores, means for moving said actuating portion associated with said keeper so that the keeper moves to a second stable position of magnetic engagement with the other spaced-apart pole faces associated with the other ends of the spaced C-shaped cores, movable contact means responsive to the movement of said movable keeper, stationary contact means cooperable with said movable contact means, first electromagnetic winding means encircling one magnetic path, second electromagnetic winding means encircling the other magnetic path, and reversible current supply means for selectively reversing the flow of direct current through said first and second winding means to augment the flux density in one ferromagnetic path and at least partially cancel the flux density in the other ferromatic path, whereby the movable keeper is selectively attracted to one of its two stable positions.

References Cited

UNITED STATES PATENTS

| | | | |
|---|---|---|---|
| 1,421,269 | 6/1922 | Lucas | 335—232 |
| 3,089,064 | 5/1963 | Bennetot | 335—302 |
| 3,115,562 | 12/1963 | Robinson | 335—179 |
| 3,350,668 | 10/1967 | McCall | 335—91 |

BERNARD A. GILHEANY, Primary Examiner

H. BROOME, Assistant Examiner

U.S. Cl. X.R.

335—179